United States Patent
Shown et al.

(10) Patent No.: US 9,809,739 B2
(45) Date of Patent: Nov. 7, 2017

(54) METHOD FOR REGENERATION OF SPENT ION EXCHANGE RESINS

(71) Applicant: Reliance Industries Limited, Mumbai (IN)

(72) Inventors: Biswajit Shown, West Bengal (IN); Swapan Ghosh, Maharashtra (IN); Asit Kumar Das, Haryana (IN); Suyog Subhash Salgarkar, Maharashtra (IN); Mukunda Madhav Baishya, Assam (IN); Mitul Amrutbhai Ladani, Gujarat (IN); Chirag Dalpatbhai Panseriya, Rajkot (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 6 days.

(21) Appl. No.: 14/915,887

(22) PCT Filed: Aug. 19, 2014

(86) PCT No.: PCT/IN2014/000531
§ 371 (c)(1),
(2) Date: Mar. 1, 2016

(87) PCT Pub. No.: WO2015/029057
PCT Pub. Date: Mar. 5, 2015

(65) Prior Publication Data
US 2016/0199829 A1    Jul. 14, 2016

(30) Foreign Application Priority Data
Sep. 2, 2013 (IN) .......................... 2850/MUM/2013

(51) Int. Cl.
*B01J 41/20* (2006.01)
*C09K 8/524* (2006.01)
(Continued)

(52) U.S. Cl.
CPC ............... *C09K 8/524* (2013.01); *B01J 41/20* (2013.01); *B01J 49/57* (2017.01); *B01J 49/60* (2017.01)

(58) Field of Classification Search
USPC ............................................ 521/26; 210/673
See application file for complete search history.

(56) References Cited

U.S. PATENT DOCUMENTS

| 2,936,424 | A |   | 12/1960 | Ayers et al. |
| 2,963,424 | A | * | 12/1960 | Ayers ..................... C10G 25/02 208/26 |

(Continued)

FOREIGN PATENT DOCUMENTS

| WO |        0218519      | 3/2002 |
| WO | WO-02/18519 A1    * | 3/2002 |

(Continued)

*Primary Examiner* — Mark Kaucher
*Assistant Examiner* — Henry Hu
(74) *Attorney, Agent, or Firm* — Fish IP Law LLC

(57) ABSTRACT

The present disclosure relates to a method for regeneration of spent ion exchange resins to obtain regenerated ion-exchange resins. The regenerated ion exchange resins can efficiently reduce the total acid number (TAN) of highly acidic crude oils. The present disclosure particularly relates to a method of treatment of spent ion exchange resins using at least one non-acidic crude oil condensate and at least one polar organic solvent.

11 Claims, 1 Drawing Sheet

(51) Int. Cl.
*B01J 49/57* (2017.01)
*B01J 49/60* (2017.01)

(56) References Cited

U.S. PATENT DOCUMENTS

| | | | | |
|---|---|---|---|---|
| 4,037,656 A | * | 7/1977 | Cooper | C09K 8/584 |
| | | | | 166/270.1 |
| 2010/0051556 A1 | * | 3/2010 | Grott | C02F 1/42 |
| | | | | 210/673 |
| 2013/0126395 A1 | * | 5/2013 | Koseoglu | C10G 25/11 |
| | | | | 208/253 |
| 2016/0199829 A1 | | 7/2016 | Shown et al. | |

FOREIGN PATENT DOCUMENTS

| | | |
|---|---|---|
| WO | 02099013 | 12/2002 |
| WO | WO-02/099013 A2 * | 12/2002 |

* cited by examiner

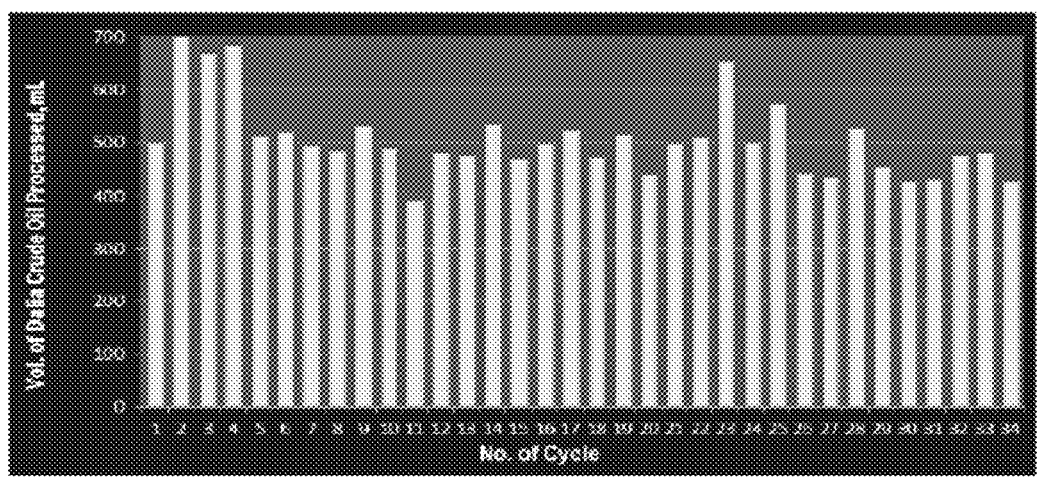

METHOD FOR REGENERATION OF SPENT ION EXCHANGE RESINS

This application is a National Phase of PCT/IN2014/000531 filed Mar. 1, 2014 which claims priority to Indian Patent Application Number 2850/MUM/2013 filed Sep. 2, 2013. These and all other extrinsic references are incorporated herein by reference in their entirety.

FIELD OF THE DISCLOSURE

The present disclosure relates to a method for regeneration of spent ion exchange resins.

BACKGROUND

Petroleum crude oils contain many impurities such as organic acids and asphaltenes. Amongst the organic acids, naphthenic acids are one of the major impurities. Naphthenic acids are highly corrosive and corrode the refining process equipment. Generally, naphthenic acid causes severe corrosion at high temperature i.e., 200 to 400° C. Moreover, due to the presence of polar carboxylic acid groups, low molecular weight naphthenic acids act as surfactants and during the desalting process they create problems by forming tight water-in-oil emulsion.

Due to the above mentioned processing problems, naphthenic acid removal from crude oil is necessary. There are several methods available for removing acidic components from crude oil including neutralization using oxides or hydroxides of alkali or alkaline earth metals or amine compounds, treatment with zeolites, esterification with alcohols, use of ion-exchange method and the like.

Although neutralization or esterification methods are simple to execute, they lead to conversion of the acidic portion into metal salts which create problem in the downstream process unit.

However, no harmful byproduct is evolved in ion-exchange method. Therefore, it is a widely used method for the de-acidification of crude oil.

The ion-exchange resin after it has been spent, due to the saturation of acids, needs to be regenerated for restoring the ion-exchange capability.

U.S. Pat. No. 4,037,656 discloses a method for removing carboxylic acids from the carboxylic acid containing ion-exchange resin. In the method, carboxylic acid containing ion-exchange resin is contacted with an alcoholic caustic solution to remove carboxylic acid.

However, this method is not satisfactory because it does not remove carboxylic acids efficiently and hence is incapable of regenerating the ion-exchange resin completely. In view of this, there exists a need for a simple and efficient method for regeneration of deactivated resins to restore their ion exchange capacity.

Definition

As used in the present specification, the following word/s and phrase/s is/are generally intended to have the meanings as set forth below, except to the extent that the context in which they are used indicate otherwise.

The term "adherence" in the context of the specification means any compound or inorganic impurity or organic impurity present in highly acidic crude oil that may attach to the resin through physical force or chemical bond.

The term "heavy hydrocarbon" refers to hydrocarbons with carbon numbers of 6 or greater, i.e., $C_{6+}$ fractions.

OBJECTS

Some of the objects of the present disclosure, which at least one embodiment herein satisfies are as follows:

It is an object of the present disclosure to ameliorate one or more problems of the prior art or to at least provide a useful alternative.

It is another object of the present disclosure to provide a method for regeneration of spent ion exchange resins.

It is still another object of the present disclosure to provide a method of treatment of spent ion exchange resins which efficiently removes trapped heavy hydrocarbons such as resins and asphaltenes.

It is yet another object of the present disclosure to provide a method for treatment of spent ion-exchange resins which effectively reduces total acid number and trapped inorganic salts present when used for processing crude oil.

It is yet another object of the present disclosure to provide a method for regeneration of ion exchange resin which is simple and economic.

Other objects and advantages of the present disclosure will be more apparent from the following description which is not intended to limit the scope of the present disclosure.

BRIEF DESCRIPTION OF THE ACCOMPANYING DRAWING/S

The disclosure will now be explained in relation to the non-limiting accompanying drawing/s, in which:

FIG. 1 illustrates the consistency of the resin recycled up to 34 recycles using the method of the present disclosure to process highly acidic crude oil

SUMMARY

In one aspect of the present disclosure there is provided a method of treatment of at least partially spent ion-exchange resin to obtain regenerated ion-exchange resin, said method comprising the following steps:

a) contacting said partially spent ion-exchange resin with at least one non-acidic crude oil condensate to obtain partially cleansed ion-exchange resin;

b) contacting said partially cleansed ion-exchange resin with at least one polar organic solvent to obtain heavy hydrocarbon free ion-exchange resin;

c) treating said heavy hydrocarbon free ion-exchange resin with at least one alkali or alkaline earth metal hydroxide solution to obtain activated ion-exchange resin; and d) iteratively washing said activated ion-exchange resin for removing organic acids trapped in said activated ion-exchange resin to obtain a regenerated ion-exchange resin.

In one embodiment of the present disclosure the method steps (a)-(d) are carried out in a column.

The method of the present disclosure is characterized in that the proportion of said spent ion-exchange resin and said non-acidic crude oil condensate ranges from 1:1 to 1:10, and the proportion of said spent ion exchange resin and said polar organic solvent ranges from 1:0.5 to 1:5.

The non-acidic crude oil condensate can be at least one crude oil having boiling point in the range of 35° C. to 370° C.

Preferably, the non-acidic crude oil condensate is at least one crude oil selected from the group consisting of naphtha, light kerosene, toluene, heavy kerosene and diesel.

The spent ion-exchange resin can be an anion exchange resin.

Preferably, the spent ion-exchange resin is a macro porous anion exchange resin comprising:
  i. at least one functional group selected from the group consisting of benzyl trimethyl amine chloride, benzyl dimethyl ethanolamine chloride, tertiary ammonium chloride and quaternary ammonium chloride; and
  ii. a resin matrix containing at least one polymer selected from the group consisting of styrene di-vinyl benzene copolymer and polystyrene co-polymer.

The organic acid can be at least one compound represented by $R(CH_2)_nCOOH$,

Wherein,

R is selected from the group consisting of substituted or un-substituted alkyl group and substituted or un-substituted cycloalkyl ring; and 'n' ranges from 6 to 28.

The polar organic solvent can be at least one solvent selected from the group consisting of methanol, ethanol, propanol, isopropanol, butanol, isobutanol, t-butanol, pentanol, dichloromethane and carbon tetrachloride.

The alkali or alkaline earth metal hydroxide can be at least one compound selected from the group consisting of lithium hydroxide (LiOH), sodium hydroxide (NaOH), potassium hydroxide (KOH), rubidium hydroxide (RbOH), caesium hydroxide (CsOH), strontium hydroxide (Sr(OH)2) and barium hydroxide (Ba(OH)2).

The washing can be carried out by using demineralized water.

DETAILED DESCRIPTION

In one aspect of the present disclosure there is provided a method of treatment of at least partially spent ion-exchange resin to obtain regenerated ion-exchange resin. In the method of the present disclosure, the inventors have employed a combination of a light crude oil condensate and polar organic solvent to remove adherences on the spent resin effectively.

The method of the present disclosure is described herein after.

Partially spent ion-exchange resin is obtained from a source where highly acidic crude oil is treated with ion-exchange resin for neutralization and desalting, for example, for continuous total acid number (TAN) reduction of acidic crude oils. As the ion-exchange resin is obtained after neutralization and desalting of highly acidic crude oil, it contains adherences such as asphaltenes, aromatic hydrocarbons, aliphatic hydrocarbons and other resinous material and trapped organic acids.

In the first step, the obtained spent ion-exchange resin is contacted with at least one non-acidic crude oil condensate, to obtain partially cleansed ion-exchange resin, followed by at least one polar organic solvent to obtain heavy hydrocarbon free ion-exchange resin. The non-acidic lighter crude oil condensate and the polar organic solvent do not interact with acids and salts adhered on the ion-exchange resin. However, they selectively remove the adhered compounds such as asphaltenes, aromatic hydrocarbons, aliphatic hydrocarbons and other resinous material from the spent ion-exchange resin.

The spent ion-exchange resin may be an anion exchange resin. Particularly, the spent ion-exchange resin can be a macro porous anion exchange resin comprising at least one functional group and a resin matrix. The functional group is at least one selected from the group consisting of benzyl trimethyl amine chloride, benzyl dimethyl ethanolamine chloride, tertiary ammonium chloride and quaternary ammonium chloride. The resin matrix of the ion-exchange resin consists of at least one polymer selected from the group consisting of styrene di-vinyl benzene copolymer and polystyrene copolymer.

The inventors of the present invention have found from the trials that the method steps of contacting the partially spent resin with non-acidic crude oil condensate and then with polar organic solvent increases the effectiveness of alkali/alkaline earth solution to remove organic acids.

The inventors of the present disclosure also observed that the non-acidic lighter crude oil condensates having boiling point in the range of 35° C. to 370° C. are effective in treating the spent ion-exchange resin. The non-acidic lighter crude oil particularly employed is at least one crude oil selected from the group consisting of naphtha, light kerosene, toluene, heavy kerosene and diesel. Further, to achieve optimum results the proportion of the spent ion-exchange resin and the non-acidic lighter crude oil condensate is maintained from 1:1 to 1:10.

The polar organic solvent used in treating at least partially spent ion-exchange resin is at least one solvent selected from the group consisting of methanol, ethanol, propanol isopropanol, butanol, isobutanol, t-butanol, pentanol, dichloromethane and carbon tetrachloride. The proportion of the spent ion-exchange resin and the polar organic solvent is maintained from 1:0.5 to 1:5 to achieve the desired results.

In one embodiment of the present disclosure the method step of contacting the spent ion-exchange resin with non-acidic crude oil condensate and polar organic solvent is carried out in a column.

In the next step, the heavy hydrocarbon free ion-exchange resin is treated with at least one alkali or alkaline earth metal hydroxide solution to obtain activated ion-exchange resin. In this step, carboxylate anion ($RCOO^-$) is freed after exchange with hydroxyl anion ($OH^-$) of alkali or alkaline earth metal hydroxide solution which is then removed by iterative washing with a washing media to obtain regenerated ion-exchange resin. The iterative washing is carried out by demineralized water till the pH of the media is neutral. The alkali or alkaline earth metal hydroxide used for treating the heavy hydrocarbon free ion-exchange resin is at least one selected from the group consisting of lithium hydroxide (LiOH), sodium hydroxide (NaOH), potassium hydroxide (KOH), rubidium hydroxide (RbOH), caesium hydroxide (CsOH), strontium hydroxide (Sr(OH)2) and barium hydroxide (Ba(OH)2). The organic acid trapped in the ion-exchange resin during neutralization and desalting process of the highly acidic crude oil, which is then removed by the process of the present disclosure, can be at least one compound represented by $R(CH_2)_nCOOH$; wherein, R is selected from the group consisting of substituted or un-substituted alkyl group and substituted or un-substituted cycloalkyl ring; and n ranges from 6 to 28.

It would be appreciated by a person skilled in the art that the method step of treating heavy hydrocarbon free ion-exchange resin with at least one alkali or alkaline earth metal hydroxide followed by washing with a washing media, may be carried out at least once after removing adherences using at least one non-acidic crude oil condensate and at least one polar organic solvent.

Further, any or all the method steps of the present disclosure i.e., removing adherences and treating may be repeated at least once to achieve optimum results.

The regenerated ion exchange resin obtained by using the method of the present disclosure is substantially devoid of adherences and trapped acids.

The regenerated ion-exchange resin obtained by the method of the present disclosure may be reused for at least 30 times.

The details of the disclosure will further be explained by the way of experiments which do not limit the scope of the disclosure.

Experiment 1:

In this experiment, commercial resin i.e., INDION 810 (Styrene di-vinyl benzene copolymer containing Benzyl trimethyl amine chloride as a functional group) manufactured by Ion Exchange India Ltd, was used to remove acids and salts present in highly acidic crude oil. The used resin was then regenerated by the method of the present disclosure and tested for efficiency. The efficiencies of the regenerated resins were comparatively studied by reusing the treated resins to remove acids and salts present in highly acidic crude oil.

Step 1A: Resin Packing 25 ml and 100 ml, of strongly basic macro porous anion exchange resin (INDION 810 manufactured by Ion Exchange India Ltd.) containing quaternary ammonium function group were poured in a glass column with bottom support, separately.

Step 1B: Resin Activation 5 wt % 5 BV aqueous caustic solution was passed through the packed resin at a Liquid hourly space velocity (LHSV) of 1.8/hr. and collected from the bottom. During passage of caustic solution through the resin, the resin gets activated as the $RCOO^-$ ion adhered on the resin is replaced by active $OH^-$ ion. After activation, the resin bed was washed with demineralized water till the pH of the water collected at the bottom of the column was 7 (seven).

Step 1C: Removal of Acids and Salts Present in the Highly Acidic Crude Oil

From the top of the neutralized column a highly acidic crude oil was poured with a Liquid Hourly Space Velocity of 1.8/hr. Column temperature was maintained around 50 to 55° C. by connecting with hot water circulating bath. The treated crude was collected from the bottom. The exhausted resin bed was slowly purged with N2 to remove traces of crude oils in the resin column.

Analysis of crude oil before and after subjecting to step C is provided in Table 1.

Crude oil before and after resin treatment were subjected to the following analysis:
TAN by ASTM D 664 method,
Salt content by ASTM D 3230, and
Dynamic corrosion test to check the corrosivity of treated highly acidic crude (HAC) oil as well as untreated one.

TABLE 1

| Sr. No. | Analysis of high acidic crude oil before removal of acids and salts | | Analysis of high acidic crude oil after removal of acids and salts | | % Reduction | |
|---|---|---|---|---|---|---|
| | 25 ml Bed Crude-1 | 100 ml Bed Crude-2 | 25 ml Bed Crude-1 | 100 ml Bed Crude-2 | 25 ml Bed Crude-1 | 100 ml Bed Crude-2 |
| TAN (mg KOH/gm) | 1.49 | 0.89 | 0.85 | 0.45 | 42.95 | 49.44 |
| Salt (ptb) | 3.7 | 14.8 | 1.7 | 6.8 | 54.05 | 54.04 |
| API (° API) | 22.93 | 23.32 | 22.33 | 22.35 | 2.61 | 4.16 |
| KV (cSt@40° C.) | 43.05 | 38.26 | 51.77 | 47.51 | −20.26 | −24.18 |
| Filterable Solid (ptb) | 33.8 | 138 | 14.8 | 46 | 56.21 | 66.67 |
| CCR (wt %) | 4.62 | 7.61 | 5.02 | 7.98 | −8.67 | −4.86 |
| Asphaltene (wt %) | 0.78 | 6.14 | 0.74 | 5.92 | 5.13 | 3.58 |
| Cycle | 34 | 7 | 34 | 7 | | |

Step 1D: Restoration of Ion Exchange Capacity of Spent Resin by Only Methanol

Stage i:

1 BV of methanol was passed through the resin bed obtained in step C to further remove heavy hydrocarbon deposits such as resins and asphaltenes from the resin pores to obtain heavy hydrocarbons free resin. The heavy hydrocarbon free resin was then washed with demineralized water to remove traces of methanol from the resin bed.

Stage ii:

In this stage, resin free of heavy hydrocarbons obtained in Stage i was regenerated as follows:

The spent resin was packed in a column. 5 wt % 5 BV aqueous caustic solution was passed through the packed resin at a Liquid hourly space velocity (LHSV) of 1.8/hr. and collected from the bottom. During passage of caustic solution through the resin, the resin gets activated as the $RCOO^-$ ion adhered on the resin was replaced by active $OH^-$ ion. After activation, the resin bed was washed with demineralized water till the pH of the water collected at the bottom of the column was 7 (seven).

Experiment 2:

The spent resin obtained by carrying out steps 1A to 1C of experiment 1 was further treated as follows:

Step 2D: Restoration of Ion Exchange Capacity of Spent Resin Using Only Crude Oil Stage i:

5 BV of light non-acidic crude oil condensates (API>50) was poured with Liquid Hourly Space Velocity of 1.8/h into the exhausted resin bed obtained in step C. Passing of light non-acidic crude oil condensates was carried out in a sequence of 30 min flow and 15 min holding to ensure efficient cleaning of the resin bed.

After removing heavy hydrocarbon, the resin bed was washed with 1 BV demineralized water.

Stage ii:

In this stage, resin free of heavy hydrocarbon obtained in Stage i was regenerated as follows:

The spent resin was packed in a column. 5 wt % 5 BV aqueous caustic solution was passed through the packed resin at a Liquid hourly space velocity (LHSV) of 1.8/hr. and collected from the bottom. During passage of caustic solution through resin, resin gets activated as the $RCOO^-$ ion adhered on the resin was replaced by active OH⁻ ion. After activation, the resin bed was washed with demineralized water till the pH of the water collected at the bottom of the column was 7 (seven).

Experiment 3:

The exhausted resin obtained by carrying out steps 1A to 1C of experiment 1 was further treated as follows:

Step 3D: Restoration of Ion Exchange Capacity of Spent Resin by Non-Acidic Crude Oil Condensate Followed by Methanol Stage i:

5 BV (125 ml) of light non-acidic crude oil (API>50) condensate was poured with a flow rate of 45 ml/hr. i.e., Liquid Hourly Space Velocity of 1.8/h into an exhausted resin bed obtained in Step C. Passing of light non-acidic crude oil was carried out in a sequence of 30 min flow and 15 min holding to ensure efficient cleaning of the resin bed. After cleaning by light non-acidic crude oil condensate, 1 BV of methanol was passed through the resin bed to further remove heavy hydrocarbon deposits such as resins and asphaltenes from the resin pores to obtain heavy hydrocarbon free resin. The heavy hydrocarbon free resin was then washed with demineralized water to remove traces of methanol from the resin bed.

Stage ii:

In this stage, resin free of heavy hydrocarbon obtained in Stage i was regenerated as follows:

The spent resin was packed in a column. 5 wt % 5 BV aqueous caustic solution was passed through the packed resin at a Liquid hourly space velocity (LHSV) of 1.8/hr. and collected from the bottom. During passage of caustic solution through resin, resin gets activated as the RCOO⁻ ion adhered on the resin was replaced by active OH⁻ ion. After activation, the resin bed was washed with demineralized water till the pH of the water collected at the bottom of the column was 7 (seven).

The resin obtained was tested for its recyclability by subjecting it iteratively to the similar process as mentioned in Experiment 1 step C. It was found that resin could be recycled for 34 times with consistent results. The results of recyclability study are tabulated in Table 2 herein below. Further, the consistency of resin to process highly acidic crude oil up to 34 cycles is shown in FIG. 1.

TABLE 2

Average results of recyclability study

| | |
|---|---|
| Anion Exchange Resin | Indion-810 |
| Resin Bed Volume | 25 ml |
| HAC oil used | Dalia |
| LHSV | 1.7 hr⁻¹ |
| Bed Temperature | 55° C. |
| Bed treating Condition | 5 wt. % 5 BV aq. caustic soln. |
| Solvent Used for Resin Bed Cleaning | 5 BV Grade Condensate oil followed by 1 BV MeOH |
| Average Inlet TAN | 1.49 mg KOH/gm |
| Average Out let TAN | 0.86 mg KOH/gm |
| Average TAN Reduction | 43% |
| Average Inlet Salt | 9.2 ptb |
| Average Outlet Salt | 3.5 ptb |
| Average Salt Reduction | 62% |
| Average Volume of Dalia Processed in 1 Cycle | 500 ml. (approx. 20BV) (Breakthrough was considered as outlet TAN = 0.85) |
| Total Cycle Completed | 34 (from January to August, 2012) |
| Total HAC Processed by 25 ml Resin Bed | 17.5 lt (700 times of resin vol.) |

The efficiencies of treated resin according to Experiment 1, Experiment 2 and Experiment 3 are depicted in Table 3:

TABLE 3

| Particulars | Efficiency of the resin obtained as per Experiment 1 for treating HAC oil (Only Methanol) 100 ml Bed Crude-2 | Efficiency of the resin obtained as per Experiment 2 for treating HAC oil (Only Condensate oil) 100 ml Bed Crude-2 | Efficiency of the resin obtained as per Experiment 3 for treating HAC oil (Condensate oil + Methanol) 100 ml Bed Crude-2 |
|---|---|---|---|
| TAN (mg KOH/gm) | 17.95% (decrease) | 23.09% (decrease) | 49.44% (decrease) |
| Salt (ptb) | 17.98% (decrease) | 28.38% (decrease) | 54.04% (decrease) |
| API (° API) | 2.23% (decrease) | 4.23% (decrease) | 4.16% (decrease) |
| KV (cSt@40° C.) | −18.92% (increase) | −21.56% (increase) | −24.18% (increase) |
| Filterable Solid (ptb) | 66.1% | 66.67% | 66.67% |
| CCR (wt %) | −2.63% (increase) | −4.86% (increase) | −4.86% (increase) |
| Asphaltene (wt. %) | 3.10% (decrease) | 3.58% (decrease) | 3.58% (decrease) |
| No. of recycles | 1 | 2 | 7 |
| Corrosivity of High acidic crude oil (on CS 1010 metal) | — | — | 10 mpy for untreated crude oil 0 mpy with resin treated crude oil |

From the above results it can be concluded that the resin treated by the method of the present disclosure i.e., treating with non-acidic crude oil condensate followed by organic polar solvent is more efficient for TAN reduction of highly acidic crude (HAC) oil.

Technical Advancement and Economic Significance:

Following are the advantages of the method of the present disclosure:

improved efficiency of regenerated ion-exchange resin to reduce the total acid number (TAN) of highly acidic crude oil and reduction of restoration cycle leading to processing of more HAC oil, which further helps to increase gross refining margins (GRM).

downstream operation related issues are obviated due to the absence of naphthenic acid salt in the system.

cleaning of the resin bed with lighter oil (e.g. condensate) helps to reduce operational cost. Further, the collected crude oil condensate may be mixed with other crude oils for processing.

the method of the present disclosure not only helps to increase efficiency, but also the life cycle of the resin. salt is reduced along with acidity which helps to reduce desalter load.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A method for regeneration of spent ion-exchange resin to obtain regenerated ion-exchange resin, said method comprising the following steps:
    a. contacting said spent ion-exchange resin with at least one non-acidic crude oil condensate to obtain cleansed ion-exchange resin;
    b. contacting said cleansed ion-exchange resin with at least one polar organic solvent to obtain heavy hydrocarbon free ion-exchange resin;
    c. treating said heavy hydrocarbon free ion-exchange resin with a solution of at least one alkali or alkaline earth metal hydroxide to obtain activated ion-exchange resin;
    d. iteratively washing said activated ion-exchange resin, for removing organic acids trapped in said activated ion-exchange resin, to obtain regenerated ion-exchange resin.

2. The method as claimed in claim 1, wherein the method steps (a)-(d) are carried out in a column.

3. The method as claimed in claim 1, wherein said method is characterized in that the proportion of said spent ion-exchange resin and said non-acidic crude oil condensate ranges from 1:1 to 1:10 by volume, and the proportion of said spent ion exchange resin and said polar organic solvent ranges from 1:0.5 to 1:5 by volume.

4. The method as claimed in claim 1, wherein the non-acidic crude oil condensate is at least one crude oil having boiling point in the range of 35° C. to 370° C.

5. The method as claimed in claim 1, wherein the non-acidic crude oil condensate comprises at least one of naphtha, light kerosene, toluene, heavy kerosene and diesel.

6. The method as claimed in claim 1, wherein said spent ion-exchange resin is an anion exchange resin.

7. The method as claimed in claim 1, wherein said spent ion-exchange resin is a macro porous anion exchange resin comprising:
    i. at least one functional group selected from the group consisting of benzyl trimethyl amine chloride, benzyl dimethyl ethanolamine chloride, tertiary ammonium chloride and quaternary ammonium chloride; and
    ii. a resin matrix containing a polymer, which comprises at least one of styrene/divinylbenzene copolymer and polystyrene co-polymer.

8. The method as claimed in claim 1, wherein said organic acid is at least one compound represented by $R(CH_2)_n COOH$,
    wherein,
    R is selected from the group consisting of a substituted alkyl group, an un-substituted alkyl group, a substituted cycloalkyl ring, and an un-substituted cycloalkyl ring; and
    n ranges from 6 to 28.

9. The method as claimed in claim 1, wherein said polar organic solvent comprises at least one of methanol, ethanol, propanol, isopropanol, butanol, isobutanol, t-butanol, pentanol, and dichloromethane.

10. The method as claimed in claim 1, wherein said alkali or alkaline earth metal hydroxide comprises at least one of lithium hydroxide (LiOH), sodium hydroxide (NaOH), potassium hydroxide (KOH), rubidium hydroxide (RbOH), cesium hydroxide (CsOH), strontium hydroxide ($Sr(OH)_2$) and barium hydroxide ($Ba(OH)_2$).

11. The method as claimed in claim 1, wherein the washing is carried out by using demineralized water.

* * * * *